(12) United States Patent
Maier

(10) Patent No.: US 10,071,771 B2
(45) Date of Patent: Sep. 11, 2018

(54) LONGITUDINAL CRASH BEAM RECEIVER

(71) Applicant: Thunder Power New Energy Vehicle Development Company Limited, Central (HK)

(72) Inventor: Jens Maier, Milan (IT)

(73) Assignee: Thunder Power New Energy Vehicle Development Company Limited, Central (HK)

(*) Notice: Subject to any disclaimer, the term of this patent is extended or adjusted under 35 U.S.C. 154(b) by 0 days.

(21) Appl. No.: 15/691,213

(22) Filed: Aug. 30, 2017

(65) Prior Publication Data

US 2018/0065668 A1    Mar. 8, 2018

Related U.S. Application Data

(60) Provisional application No. 62/384,298, filed on Sep. 7, 2016.

(51) Int. Cl.
*B62D 21/15* (2006.01)
*B62D 25/08* (2006.01)
*B62D 29/00* (2006.01)

(52) U.S. Cl.
CPC ............ *B62D 21/152* (2013.01); *B62D 25/08* (2013.01); *B62D 25/085* (2013.01);
(Continued)

(58) Field of Classification Search
CPC .... B62D 21/152; B62D 21/155; B62D 25/08; B62D 21/11; B62D 25/088; B62D 25/082;
(Continued)

(56) References Cited

U.S. PATENT DOCUMENTS

| 8,454,064 B2* | 6/2013 | Frank | B60R 19/34 293/133 |
|---|---|---|---|
| 8,632,108 B2* | 1/2014 | Matuschek | B60R 19/34 293/133 |

(Continued)

FOREIGN PATENT DOCUMENTS

| DE | 102012018217 A1 | 3/2014 |
|---|---|---|
| DE | 10 2015 220915 A1 | 5/2016 |

(Continued)

OTHER PUBLICATIONS

European Search Report for EP 17189816 dated Feb. 13, 2018, 6 pages.

*Primary Examiner* — D Glenn Dayoan
*Assistant Examiner* — Sunsurraye Westbrook
(74) *Attorney, Agent, or Firm* — Kilpatrick Townsend & Stockton LLP

(57) ABSTRACT

A crash beam receiver for coupling to a crash beam for reducing the effects of a vehicle collision. The crash beam receiver includes a plurality of surfaces that are coupled together to form a hollow opening for receiving the crash beam. The crash beam receiver also includes a gate structure for providing a stopping point for the crash beam when the crash beam is inserted into the crash beam receiver. The gate structure includes a left gate, a right gate, and a protrusion structure that help to linearize the self-collapsing process of the crash beam in the longitudinal direction. The protrusion structure has a certain thickness such that the crash beam is caused to collapse inward toward its center in the event of a vehicle collision.

20 Claims, 18 Drawing Sheets

(52) U.S. Cl.
CPC ....... *B60Y 2200/91* (2013.01); *B60Y 2306/01* (2013.01); *B60Y 2410/121* (2013.01); *B62D 29/008* (2013.01)

(58) Field of Classification Search
CPC ...... B62D 25/04; B62D 25/025; B60R 19/34; B60R 2021/343; B60R 21/34; B60R 19/18; B60R 19/12; B60R 19/24; B60R 2019/247; B60R 21/38
USPC ....... 296/187.09, 29, 192, 207, 204, 193.11; 293/133, 115
See application file for complete search history.

(56) References Cited

U.S. PATENT DOCUMENTS

| | | | |
|---|---|---|---|
| 9,073,502 B2 * | 7/2015 | Blumel | ................... B60R 19/34 |
| 2014/0203578 A1 * | 7/2014 | Kaneko | ................... B60R 19/34 |
| | | | 293/133 |
| 2015/0061320 A1 * | 3/2015 | Yabu | ....................... B60R 19/18 |
| | | | 296/187.1 |

FOREIGN PATENT DOCUMENTS

| | | |
|---|---|---|
| EP | 2 165 891 A1 | 3/2010 |
| WO | 2007/035163 A1 | 3/2007 |

\* cited by examiner

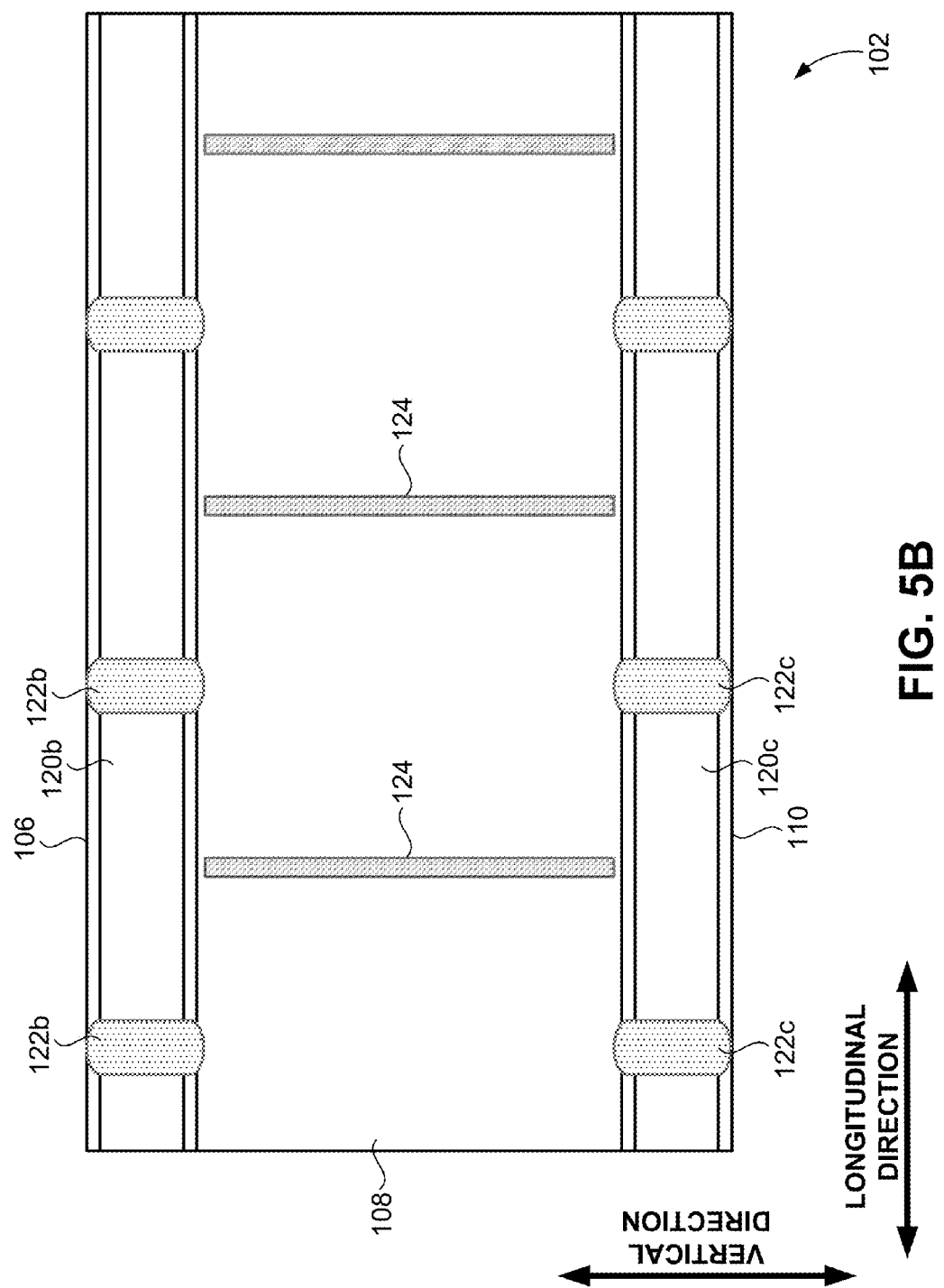

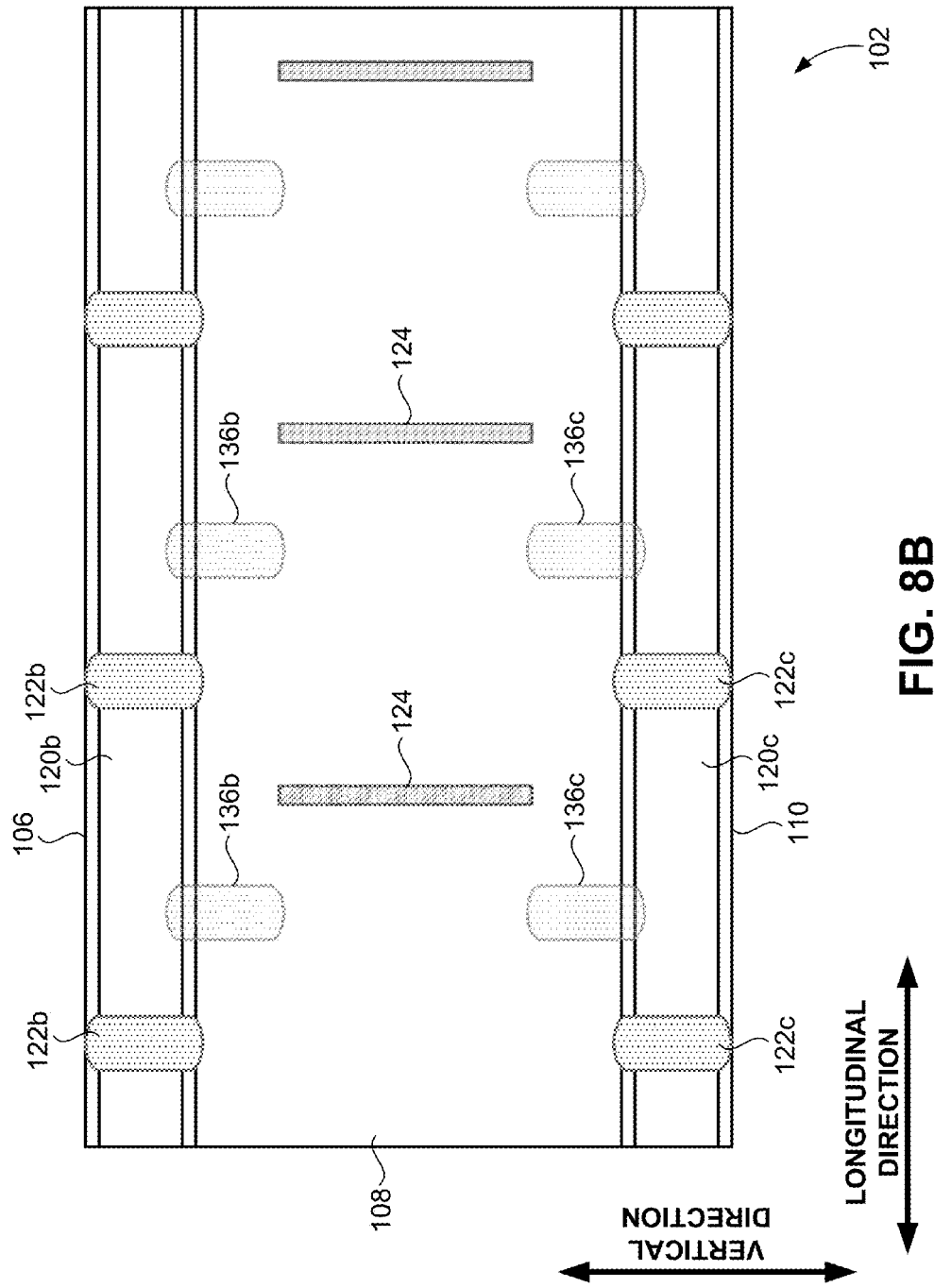

LONGITUDINAL CRASH BEAM RECEIVER

CROSS-REFERENCE TO RELATED APPLICATION

This Application claims priority to U.S. Provisional Application No. 62/384,298, entitled ELECTRIC VEHICLE COMPONENTS, filed on Sep. 7, 2016, which is hereby incorporated by reference in its entirety for all purposes.

BACKGROUND OF THE INVENTION

Vehicle manufacturers have added a number of new structural features to vehicles to improve safety and/or performance. Many of these structural features are applicable to electric, hybrid, and non-electric vehicles equally, while others place a greater emphasis on the vehicle motor type, such as a vehicle base plate with increased thickness for protecting an electric car battery over a specific region of the vehicle. Structural improvements that increase either safety or performance without a significant compromise of the other remain important objectives of vehicle manufacturers.

Electric vehicles are becoming an increasingly viable alternative to traditional vehicles with internal combustion engines. Electric vehicles may have advantages in their compactness, simplicity of design, and in being potentially more environmentally friendly depending on the means by which the electricity used in the vehicle was originally generated. The prospect of using renewable energy sources to power automobiles in place of gasoline has obvious advantages as oil reserves across the globe become increasingly depleted.

BRIEF SUMMARY OF THE INVENTION

In a first embodiment of the present disclosure, a crash beam for reducing effects of an impact force related to a vehicle collision is provided. The crash beam may include a top side extending in the longitudinal direction and coupled to a first diagonal side of a plurality of diagonal sides and to a second diagonal side of the plurality of diagonal sides. The crash beam may include a right side extending in the longitudinal direction and coupled to the second diagonal side and to a third diagonal side of the plurality of diagonal sides. The crash beam may include a bottom side extending in the longitudinal direction and coupled to the third diagonal side and to a fourth diagonal side of the plurality of diagonal sides. The crash beam may include a left side extending in the longitudinal direction and coupled to the fourth diagonal side and the first diagonal side. The crash beam may include a plurality of impressions coupled to the plurality of diagonal sides and having lesser lengths in the longitudinal direction than the plurality of diagonal sides.

In some embodiments, the crash beam may include a center rib extending in the longitudinal direction and coupled to the top side in the upward vertical direction and coupled to the bottom side in the downward vertical direction. In some embodiments, the crash beam may include an upper cross rib extending in the longitudinal direction and coupled to the left side and to the right side. In some embodiments, the crash beam may include a lower cross rib extending in the longitudinal direction and coupled to the left side and to the right side. In some embodiments, the top side, the bottom side, the upper cross rib, and the lower cross rib may be planar and parallel to each other. In some embodiments, the left side, the right side, and the center rib may be planar and parallel to each other. In some embodiments, the top side, the bottom side, the upper cross rib, and the lower cross rib may be perpendicular to the left side, the right side, and the center rib. In some embodiments, the crash beam may include one or more spacing structures being planar and extending in the lateral direction and in the vertical direction. In some embodiments, the one or more spacing structures may be coupled with the center rib, the upper cross rib, and the lower cross rib. In some embodiments, at least one of the plurality of impressions are offset in the longitudinal direction with at least one of the one or more spacing structures. In some embodiments, the one or more spacing structures are rectangular. In some embodiments, each of the plurality of impressions include a concave facet positioned on an outer surface of one of the plurality of diagonal sides.

In a second embodiment of the present disclosure, a method for receiving an impact force related to a vehicle collision is provided. The method may include receiving, by the right side, a second force related to the impact force. The method may include receiving, by the bottom side, a third force related to the impact force. The method may include receiving, by the left side, a fourth force related to the impact force. The method may include transferring a first portion of the first force received by the top side to the plurality of diagonal sides. The method may include transferring a second portion of the second force received by the right side to the plurality of diagonal sides. The method may include transferring a third portion of the third force received by the bottom side to the plurality of diagonal sides. The method may include transferring a fourth portion of the fourth force received by the left side to the plurality of diagonal sides. The method may include transferring a fifth portion of the force received by the plurality of diagonal sides to the plurality of impressions.

In a third embodiment of the present disclosure, a crash beam receiver is provided. The crash beam receiver may include a plurality of surfaces coupled together to form a hollow opening for receiving the crash beam. The plurality of surfaces may include a left surface and a right surface. The crash beam receiver may include a left gate coupled to the left surface within the hollow opening. The left gate may extend toward the right surface in the lateral direction. A left interface may include an area where the left gate couples to the left surface. The crash beam receiver may include a right gate coupled to the right surface within the hollow opening. The right gate may extend toward the left surface in the lateral direction. A right interface may include an area where the right gate couples to the right surface. The crash beam receiver may include a protrusion structure positioned at either the left interface or the right interface. The protrusion structure may extend outward in the longitudinal direction from either the left gate or the right gate. When the protrusion structure is positioned at the left interface, a portion of the right gate may overlap and cover a portion of the left gate in the lateral direction. When the protrusion structure is positioned at the right interface, a portion of the left gate may overlap and cover a portion of the right gate in the lateral direction.

In some embodiments, the protrusion structure may be positioned along either all of the left interface or all of the right interface. In some embodiments, the plurality of surfaces may include a top surface and a bottom surface. The left gate may be coupled to the top surface and the bottom surface. The left interface may include an area where the left gate couples to the top surface and an area where the left gate couples to the bottom surface. The right gate may be coupled to the top surface and the bottom surface. The right interface may include an area where the right gate couples to the top surface and an area where the right gate couples to the bottom surface. In some embodiments, the plurality of surfaces may include a plurality of diagonal surfaces. The left gate may be coupled to at least two of the plurality of diagonal surfaces. The left interface may include an area where the left gate couples to the at least two of the plurality of diagonal surfaces. The right gate may be coupled to at least two of the plurality of diagonal surfaces. The right interface may include an area where the right gate couples to the at least two of the plurality of diagonal surfaces. In some embodiments, the left gate may be narrower toward the right lateral direction and wherein the right gate may be narrower toward the left lateral direction. In some embodiments, the left gate may have the same length in the lateral direction as the right gate. In some embodiments, the left surface and the right surface may be planar and parallel to each other.

In a fourth embodiment of the present disclosure, a method for receiving an impact force related to a vehicle collision is provided. The method may include receiving, by the crash beam, a first force related to the impact force. The method may include transferring a first portion of the first force received by the crash beam to the right gate. The method may include transferring a second portion of the first force received by the crash beam to the protrusion structure. The method may include transferring a third portion of the force received by the right gate to the left gate. The method may include transferring a fourth portion of the force received by the protrusion structure to the left gate.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

FIG. 5B illustrates a side view of a crash beam, according to an embodiment of the present disclosure.

FIG. 8B illustrates a side view of a crash beam, according to an embodiment of the present disclosure.

Figure 1:
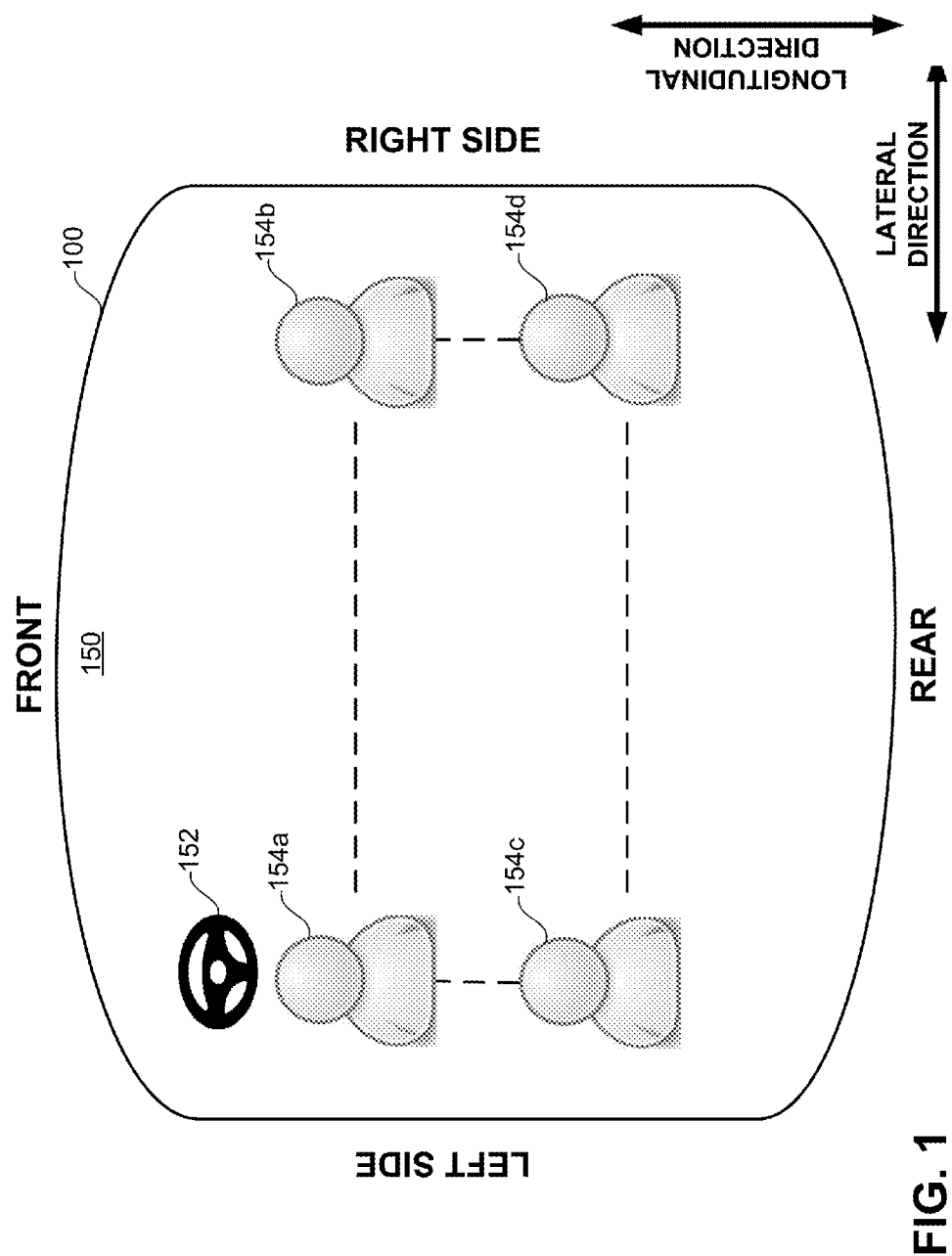
FIG. 1 illustrates a generalized transportation apparatus, according to an embodiment of the present disclosure.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

Embodiments of the present disclosure relate to a longitudinal crash beam situated in an electric vehicle for reducing the effects of a vehicle collision. The crash beam, along with other surrounding components coupled with the crash beam, are designed specifically to allow the crash beam to initiate a self-collapsing process in the event of a vehicle collision. The self-collapsing process is triggered by the application of a longitudinal force to a set of impressions positioned along the outside surface of the crash beam. The set of impressions are designed to fold simultaneously to ensure that the crash beam deforms and folds onto itself instead of folding laterally or vertically. Components surrounding the crash beam that are designed to aid the self-collapsing process of the crash beam include a crash beam receiver, a crash wall, a front securement member, a middle securement member, a rear securement member, and a crash tower. These components are described in further detail below.

Safety benefits of the crash beam include, but are not limited to: (1) increased rigidity of the vehicle, (2) increased absorption of energy, and (3) increased linearization of energy/force stemming from a front impact to the vehicle such that energy can be channeled through the crash beam receiver toward the body structure and/or chassis, lessening the potential impact applied to the vehicle battery and to passengers in the vehicle. For electric vehicles, an increased emphasis is placed on protection of the electric battery as damage to battery cells can cause explosion and fires within the vehicle. The problem is compounded due to the large amount of space batteries must occupy within electric vehicles in order to maintain practical driving ranges. Therefore, vehicle alterations that channel energy away from the vehicle battery are advantageous.

The crash beam described herein may be an aluminum casting part that is manufactured as a single integrated piece. In other embodiments, the crash beam comprises multiple different manufactured components that are later fastened together. Furthermore, the crash beam need not be aluminum but may be manufactured from a wide range of materials that are either currently available (such as carbon fiber or steel) or will be developed in the future.

Embodiments of the present disclosure also relate to a crash beam receiver for coupling to the crash beam. The crash beam receiver includes a plurality of surfaces that are coupled together to form a hollow opening for receiving the crash beam. The crash beam receiver also includes a gate structure for providing a stopping point for the crash beam when the crash beam is inserted into the crash beam receiver. The gate structure includes a left gate, a right gate, and a protrusion structure that help to linearize the self-collapsing process of the crash beam in the longitudinal direction. The protrusion structure has a certain thickness such that the crash beam is caused to collapse inward toward its center.

FIG. 1 illustrates a generalized transportation apparatus 100, according to an embodiment of the present disclosure. Transportation apparatus 100 may include any apparatus that moves in distance. Examples of transportation apparatus 100 may include a vehicle such as a car, a bus, a train, a truck, a tram, or any other type of vehicle; may include a vessel such as a boat, a ship, a barge, a ferry or any other type of watercraft; may include an aircraft such as an airplane, a helicopter, a spaceship, or any other type of aircraft; or may include any other transportation apparatus. In some embodiments, transportation apparatus 100 is an electrical automobile. As shown, transportation apparatus 100 may include a cabin 150 with a volume.

As shown in FIG. 1, transportation apparatus 100 may comprise one or more steering wheels 152 in cabin 150. Although only one steering wheel 152 is shown in FIG. 1, this is not intended to be limiting. In some examples, transportation apparatus 100 may include more than one steering wheel 152. For example, it is contemplated that transportation apparatus 100 may be an aircraft that comprises at least a main steering wheel 152 for the main pilot and at least a secondary steering wheel 152 for the co-pilot.

As also shown in FIG. 1, one or more users 154 may be arranged to occupy their corresponding positions in cabin 150. Users 154 may include one or more drivers that control the movement or navigation of transportation apparatus 100, one or more passengers, and/or any other type of users 154. In this example, user 154a is a driver that controls the driving of transportation apparatus 100, while other users 154, e.g., users 154b-d, are passengers. As still shown, there may be multiple rows of users 154 within cabin 150 of transportation apparatus 100.

Figure 2:
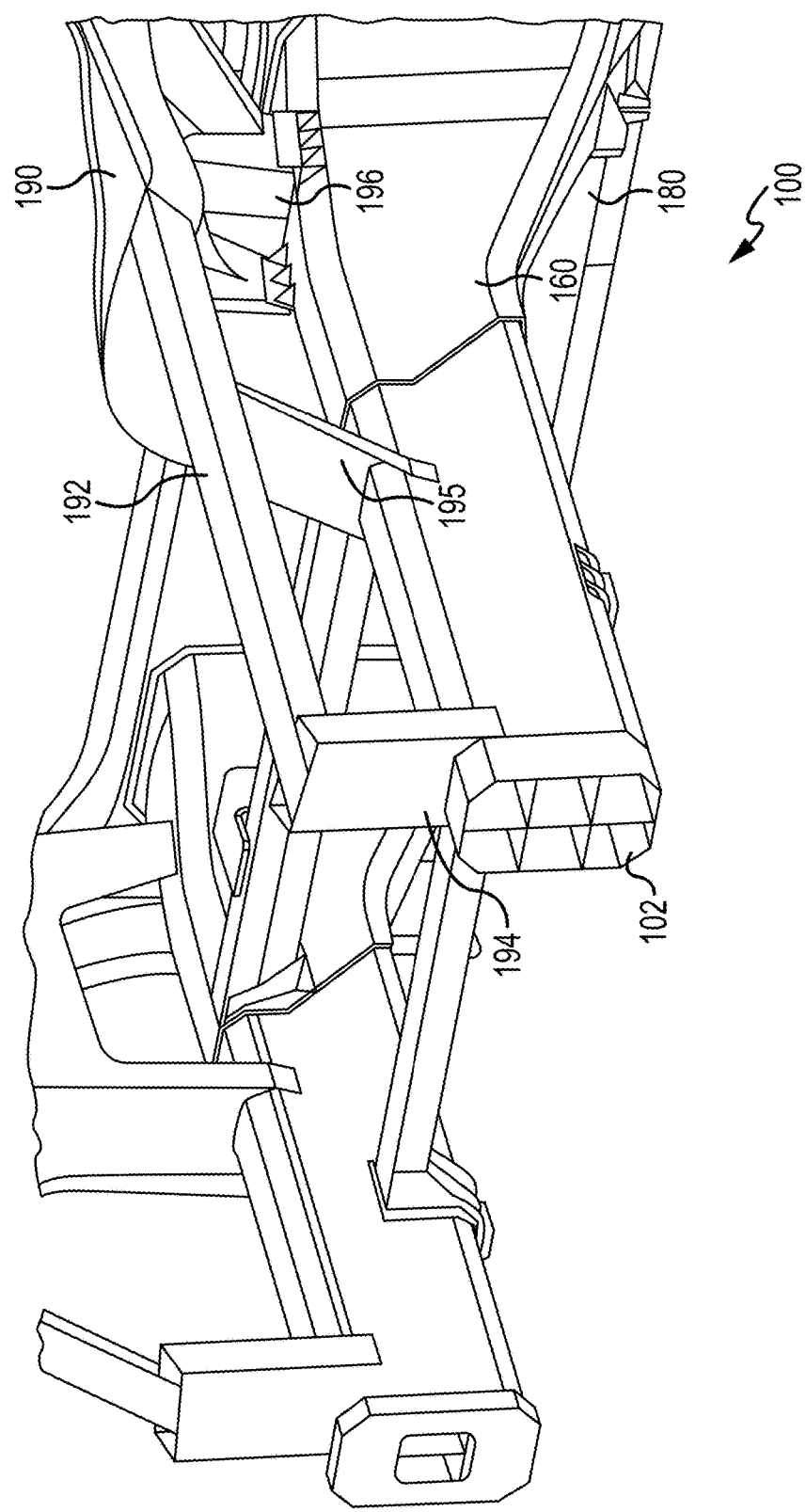
FIG. 2 illustrates a perspective view of a front region of an electric vehicle, according to an embodiment of the present disclosure.

FIG. 2 illustrates a perspective view of a front region of an electric vehicle 100, according to an embodiment of the present disclosure. The electric vehicle 100 includes a crash beam 102 oriented in the longitudinal direction with one end directed toward the front of the electric vehicle 100, possibly coupled to the bumper, and the other end directed toward the rear of the electric vehicle 100. Coupled vertically above to the crash beam 102 are a front securement member 194, a middle securement member 195, and a rear securement member 196. The middle securement member 195 and the rear securement member 196 are coupled directly to a crash tower 190 while the front securement member 194 is coupled to a longitudinal beam 192 which is coupled to the crash tower 190.

In some embodiments, the crash beam 102 interfaces with and is coupled to a crash beam receiver 160. A receiving portion of the crash beam receiver 160 may be hollow such that the crash beam 102 is inserted therein for coupling the two components. The crash beam receiver 160 may be coupled to a crash wall 180 which may be the same as or different than the vehicle firewall. The crash wall 180 may be anchored to the body structure and/or chassis of the vehicle causing a portion of the energy received by the crash wall 180 to be transferred to the body structure and/or chassis. In some embodiments, the front region of the electric vehicle 100 is symmetrical in the lateral direction such that the electric vehicle 100 comprises two parallel crash beams and two of each of the surrounding components.

Figure 3:
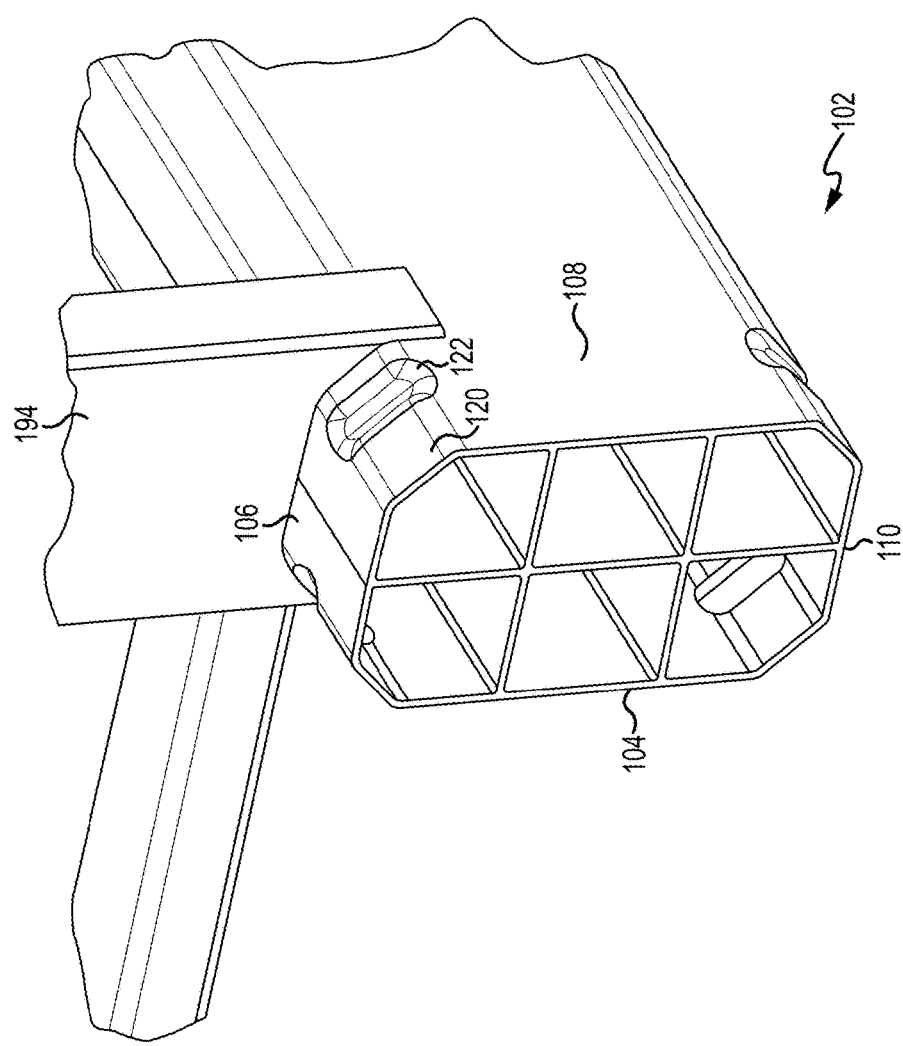
FIG. 3 illustrates a perspective view of a crash beam, according to an embodiment of the present disclosure.

FIG. 3 illustrates a perspective view of the crash beam 102, according to an embodiment of the present disclosure. In some embodiments, the crash beam 102 includes multiple outer sides, including a left side 104, a top side 106, a right side 108, and a bottom side 110 that are coupled together and extend in the longitudinal direction. In some embodiments, these sides are directly coupled together forming a rectangular cross section. In other embodiments, they are indirectly coupled together via one or more diagonal sides 120. In some embodiments, the diagonal sides 120 form 135 degree angles with respect to each of the left side 104, the top side 106, the right side 108, and the bottom side 110.

The crash beam 102 may include one or more impressions 122 positioned along the outer surface of the crash beam 102. In some embodiments, the impressions 122 are coupled to the diagonal sides 120 such that the impressions 122 may each include a concave facet positioned on the outer surface of the diagonal sides 120. The impressions 122 may be considered as being part of the diagonal sides 120 or as being a separate component coupled to the diagonal sides 120. The impressions 122 may have a length in the longitudinal direction that is less than the length of the diagonal sides 120 in the longitudinal direction such that each of the impressions 122 is localized to a specific region along the crash beam 102. Different impressions may be aligned or offset in the longitudinal direction. In general, the self-collapsing process of the crash beam 102 is improved where at least two of the impressions 122 are aligned in the longitudinal direction.

Figure 4:
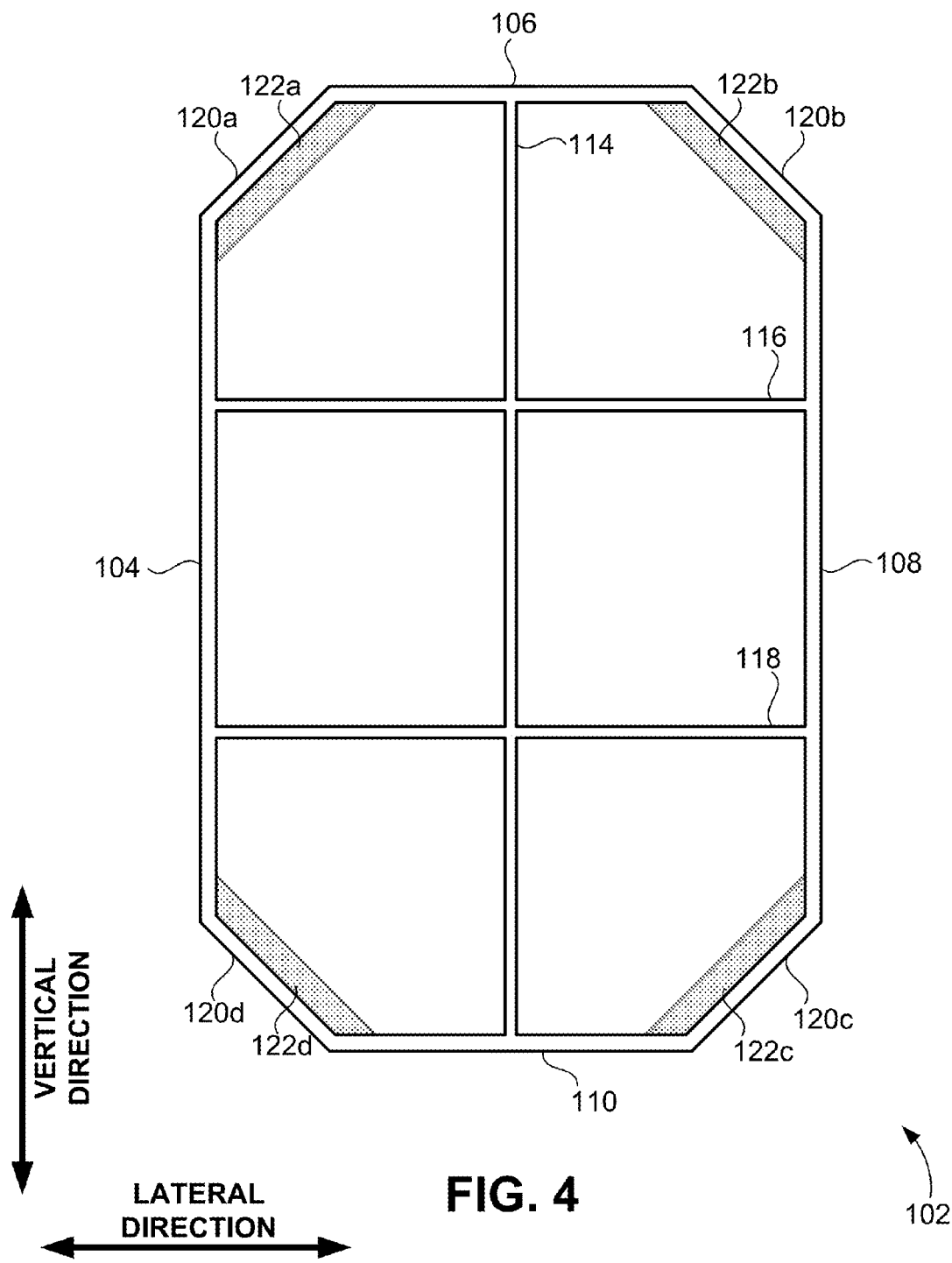
FIG. 4 illustrates a front view of a crash beam, according to an embodiment of the present disclosure.

FIG. 4 illustrates a front view (and cross-sectional view) of the crash beam 102, according to an embodiment of the present disclosure. In some embodiments, the crash beam 102 includes four diagonal sides 120 and four impressions 122. In some embodiments, the impressions 122 may be coupled to one of the diagonal sides 120 and to the two adjacent sides. For example, the impression 122a is coupled to the diagonal side 120a and to the left side 104 and the top side 106. In some embodiments, the concave portion of the impressions 122 may extend inward toward the center of the crash beam 102 at a greater depth than is shown in FIG. 4. Increasing the depth of the impressions 122 improves the self-collapsing process of the crash beam 102 at the cost of decreased rigidity and decreased absorption of energy.

In some embodiments, the crash beam 102 includes a center rib 114 extending in the vertical direction between the top side 106 and the bottom side 110, the center rib 114 being coupled to both. The center rib 114 extends in the longitudinal direction parallel to the left side 104 and the right side 108. In some embodiments, the center rib 114 has a smaller thickness than the outer sides of the crash beam 102 to improve the self-collapsing process of the crash beam 102. In some embodiments, the center rib 114 has the same thickness as the outer sides of the crash beam 102 but is derived from a weaker material than the outer sides. In some embodiments, the center rib 114 is positioned such that it is centered with the crash beam 102 in the lateral direction.

In some embodiments, the crash beam 102 includes an upper cross rib 116 extending in the lateral direction between the left side 104 and the right side 108 and extending in the longitudinal direction parallel to the top side 106 and the bottom side 110. In some embodiments, the crash beam 102 includes a lower cross rib 118 extending in the lateral direction between the left side 104 and the right side 108 and extending in the longitudinal direction parallel to the top side 106 and the bottom side 110. The upper cross rib 116 and the lower cross rib 118 improve the self-collapsing process of the crash beam 102, increase the rigidity of the crash beam 102, and increase the absorption of energy of the crash beam 102 in the event of a vehicle collision. In some embodiments, the upper cross rib 116 and the lower cross rib 118 are spaced evenly in the vertical direction such that they are equidistant from each other and from the top side 106 and the bottom side 110. In some embodiments, the upper cross rib 116 and the lower cross rib 118 are not spaced equidistant but are both positioned below a vertical half way line of the crash beam 102 so that energy is channeled in the downward vertical direction in the event of a vehicle collision.

Figure 5A:
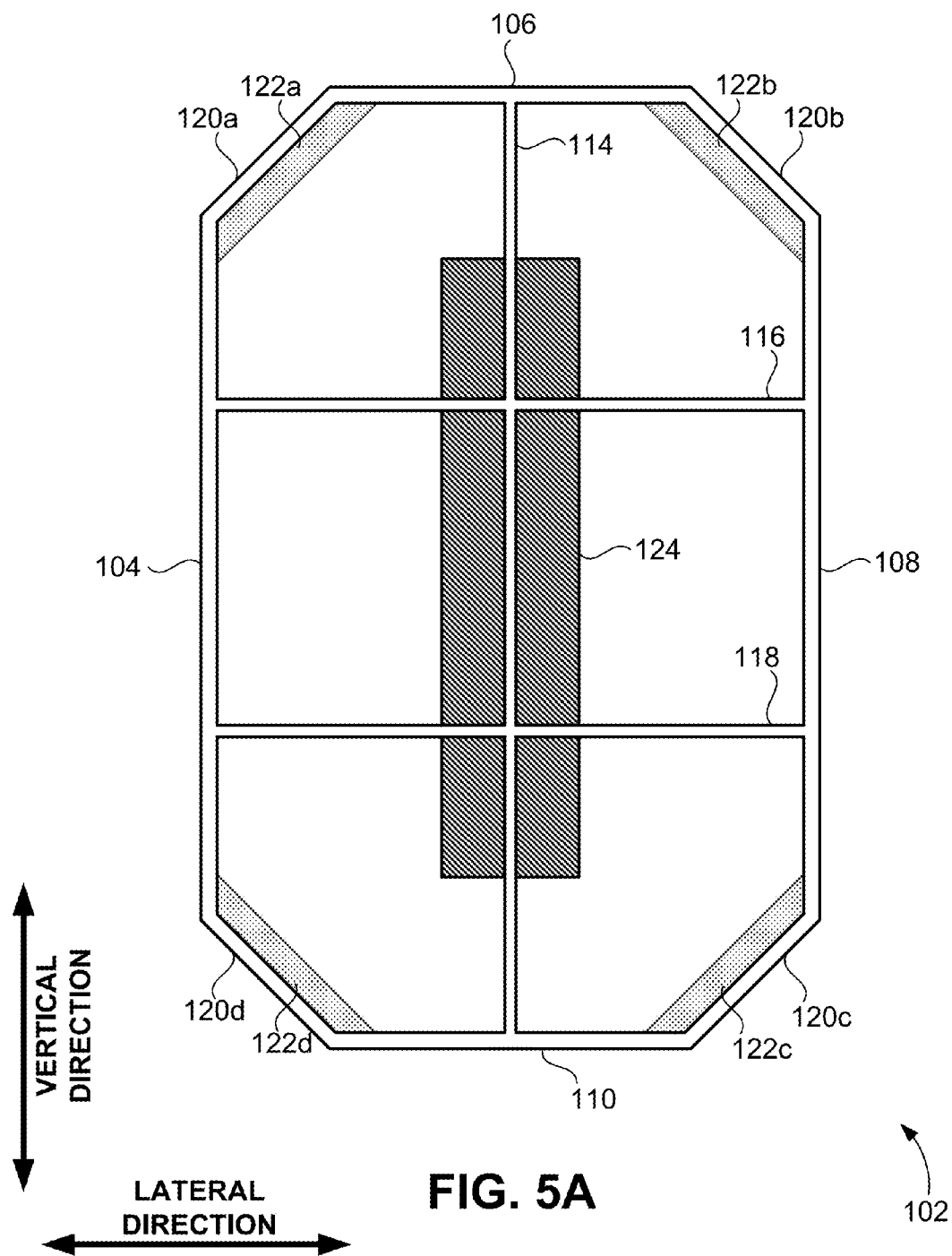
FIG. 5A illustrates a front view of a crash beam, according to an embodiment of the present disclosure.

FIG. 5A illustrates a front view of the crash beam 102, according to an embodiment of the present disclosure. In some embodiments, the crash beam 102 includes one or more spacing structures 124 coupled with the center rib 114, the upper cross rib 116, and the lower cross rib 118. One purpose of the spacing structure 124 is to improve the self-collapsing process of the crash beam 102 by allowing the crash beam 102 to flatten linearly. For example, during the self-collapsing process a hollow core may be formed within the crash beam 102 that may, in some circumstances, cause the crash beam 102 to contort at an angle. The spacing structure 124 lessens this effect by filling the hollow core that is formed during the self-collapsing process. The spacing structure 124 may be planar and may extend in the lateral direction and in the vertical direction. The spacing structure 124 may be rectangular, square, circular, or of some other shape.

FIG. 5B illustrates a side view of the crash beam 102, according to an embodiment of the present disclosure. FIG. 5B illustrates the embodiments in which the spacing structures 124 and the impressions 122 include multiple layers that are offset in the longitudinal direction, which may improve the self-collapsing process. In some embodiments, different layers of the spacing structures 124 and the impressions 122 are aligned with each other in the longitudinal direction. In some embodiments, the crash beam 102 includes only a single layer of impressions 122 and a single spacing structure 124 that is aligned with the single layer of impressions 122.

Figure 6:
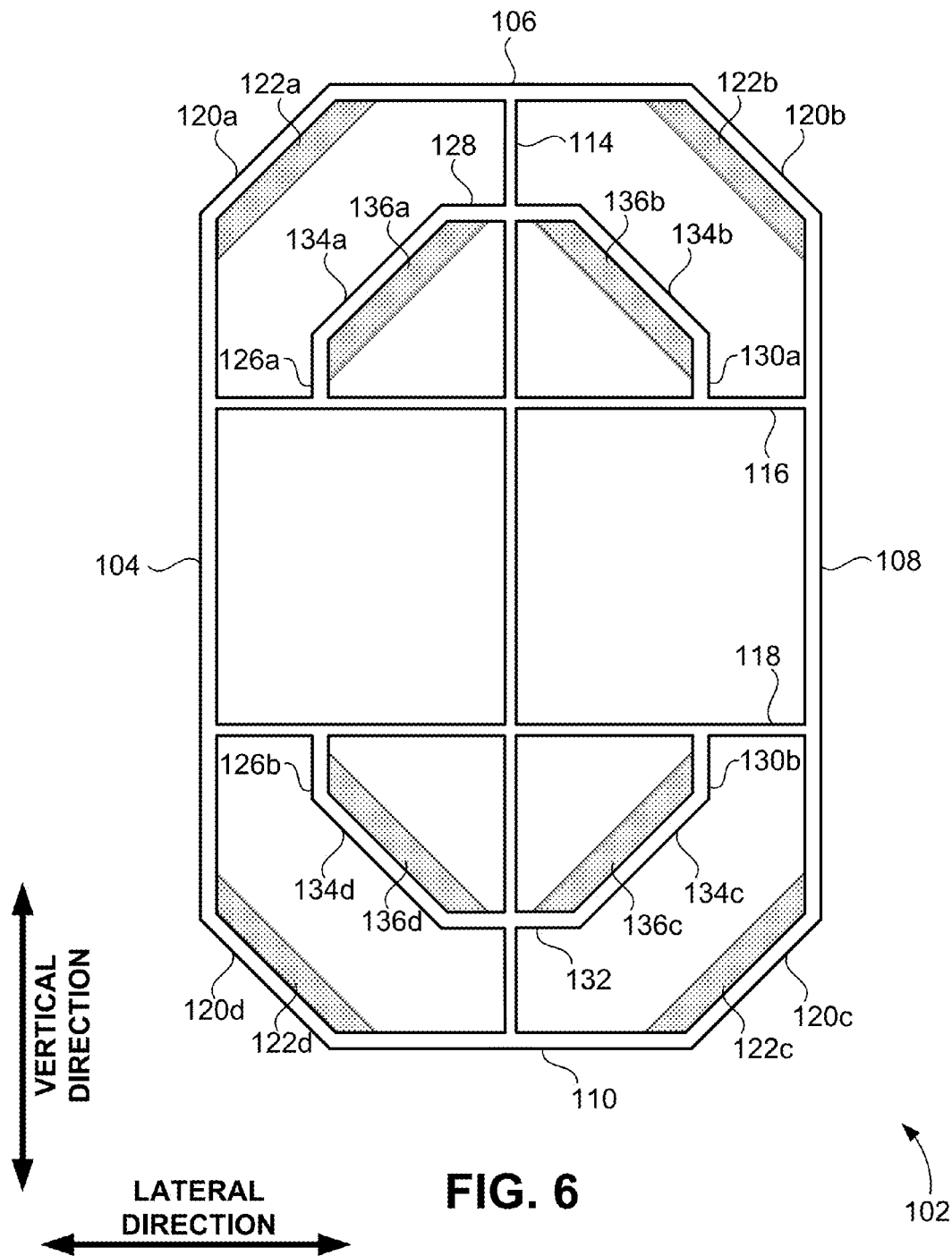
FIG. 6 illustrates a front view of a crash beam, according to an embodiment of the present disclosure.

FIG. 6 illustrates a front view of the crash beam 102, according to an embodiment of the present disclosure. In some embodiments, the crash beam 102 includes additional internal structures to improve the self-collapsing process. For example, in some embodiments, the crash beam 102 includes an inner left side 126, an inner top side 128, an inner right side 130, and an inner bottom side 132. In some embodiments, these sides are directly coupled together forming a rectangular cross section. In other embodiments, they are indirectly coupled together via one or more inner diagonal sides 134. The crash beam 102 may include one or more inner impressions 136 coupled to the inner diagonal sides 134 and the two adjacent sides, similar to the configuration of the impressions 120. In some embodiments, both the inner left side 126 and the inner right side 130 include two separate non-coupled components such that a hollow center portion of the crash beam 102 between the upper cross rib 116 and the lower cross rib 118 is preserved.

Figure 7:
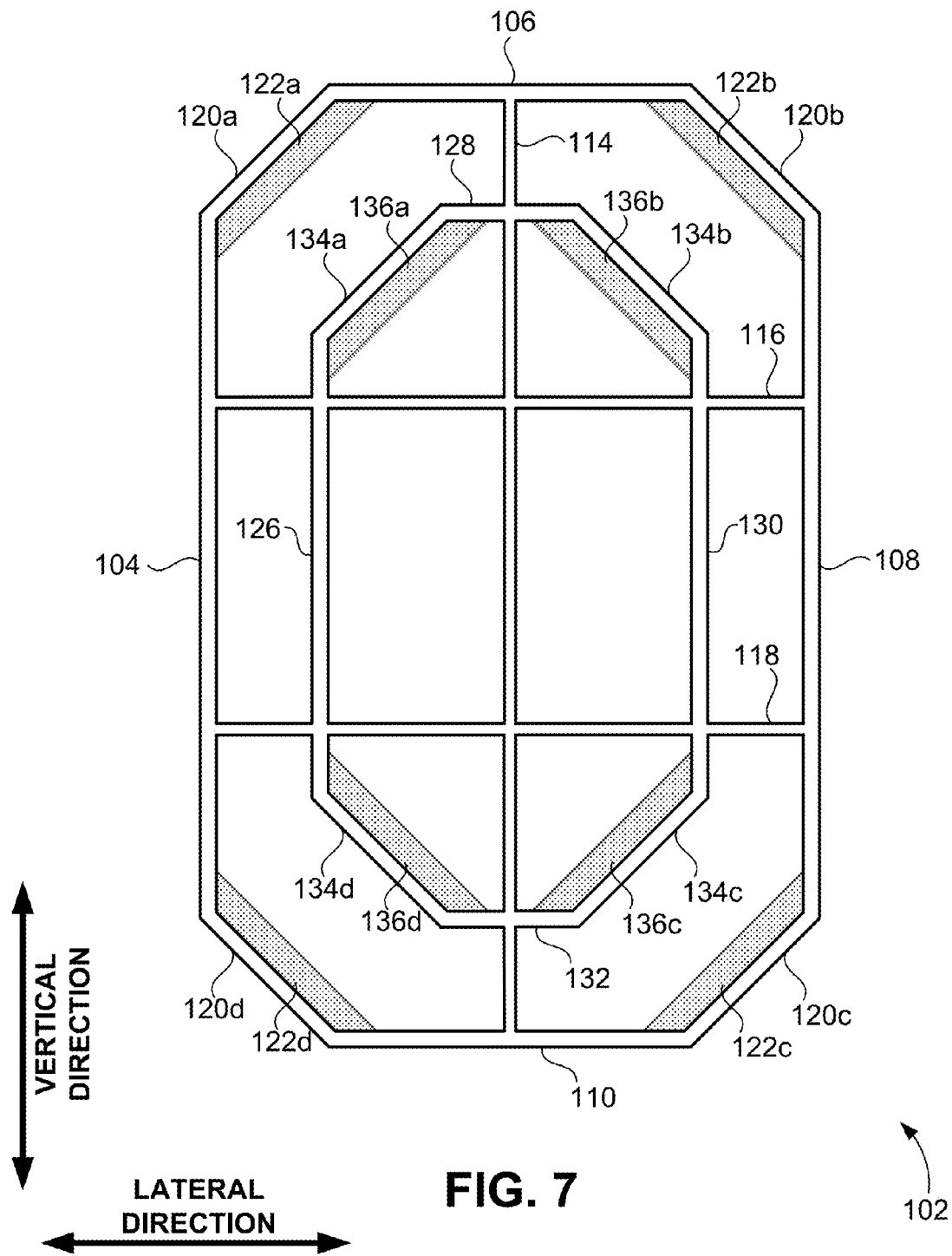
FIG. 7 illustrates a front view of a crash beam, according to an embodiment of the present disclosure.

FIG. 7 illustrates a front view of the crash beam 102, according to an embodiment of the present disclosure. In some embodiments, both the inner left side 126 and the inner right side 130 extend between the upper cross rib 116 and the lower cross rib 118.

Figure 8A:
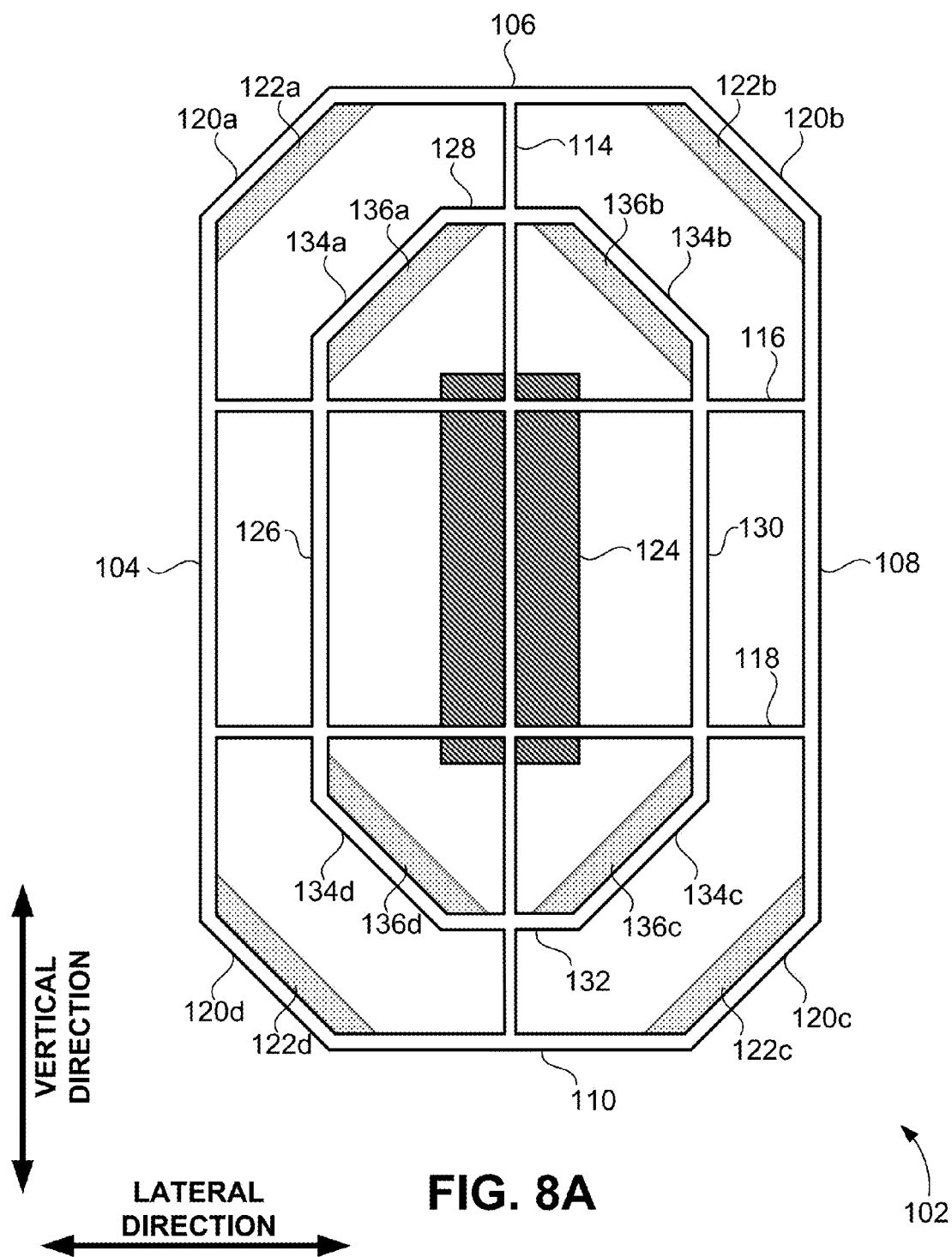
FIG. 8A illustrates a front view of a crash beam, according to an embodiment of the present disclosure.

FIG. 8A illustrates a front view of the crash beam 102, according to an embodiment of the present disclosure. In some embodiments, the spacing structure 124 may be coupled to one or more of the inner left side 126, the inner top side 128, the inner right side 130, the inner bottom side 132, and the inner diagonal sides 134. In some embodiments, the spacing structure 124 has the same shape as the combination of the inner left side 126, the inner top side 128, the inner right side 130, the inner bottom side 132, and the inner diagonal sides 134.

Figure 8C:
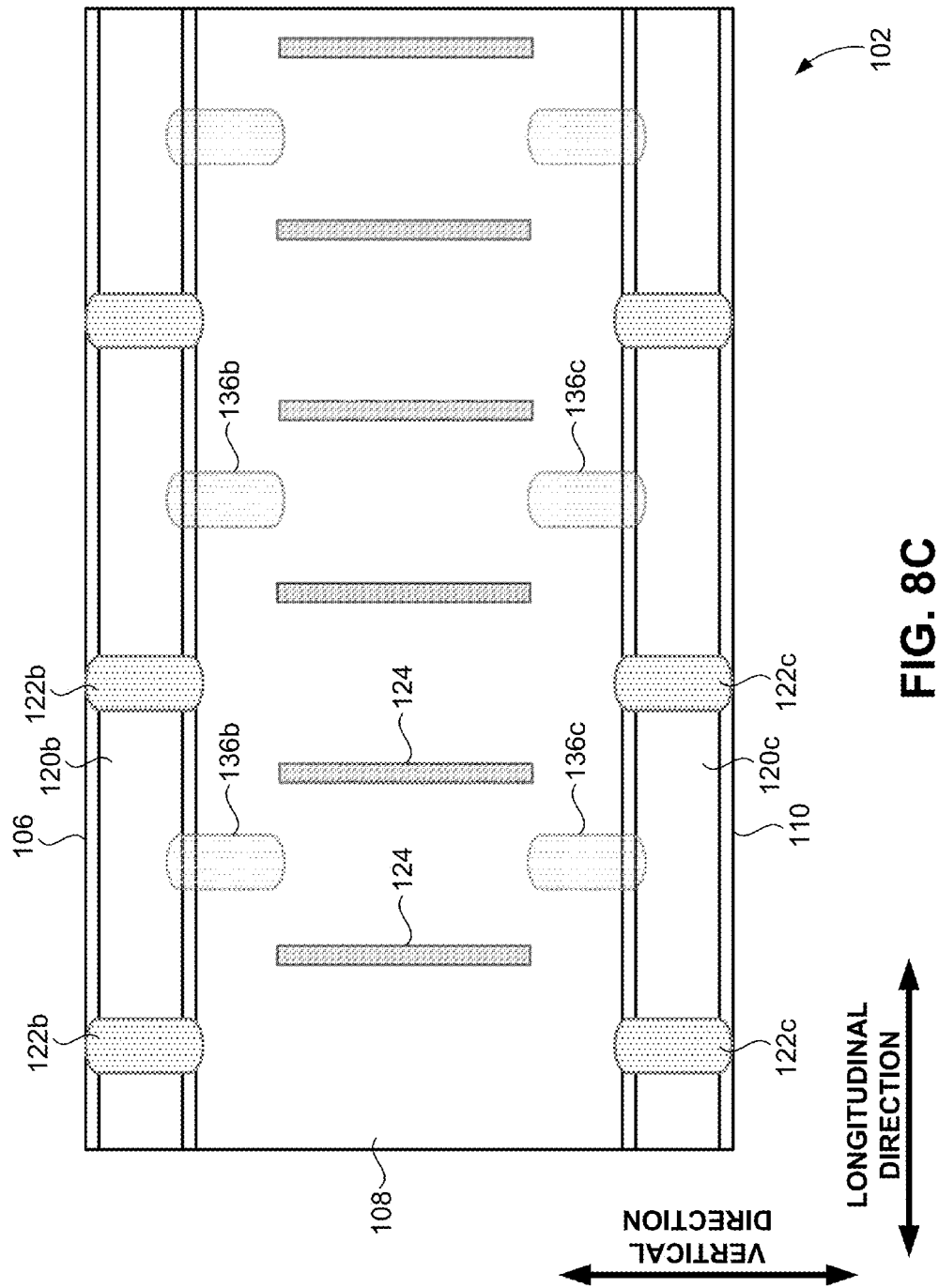
FIG. 8C illustrates a side view of a crash beam, according to an embodiment of the present disclosure.

FIGS. 8B and 8C illustrate a side view of the crash beam 102, according to various embodiments of the present disclosure. In some embodiments, each of the impressions 122, the inner impressions 136 and the spacing structures 124 include multiple layers that are offset in the longitudinal direction, which may improve the self-collapsing process. In some embodiments, each layer of impressions may be separated by the spacing structures 124 (as shown in FIG. 8C). In some embodiments, different layers of the impressions 122, the inner impressions 136 and the spacing structures 124 are aligned with each other in the longitudinal direction.

Figure 9:
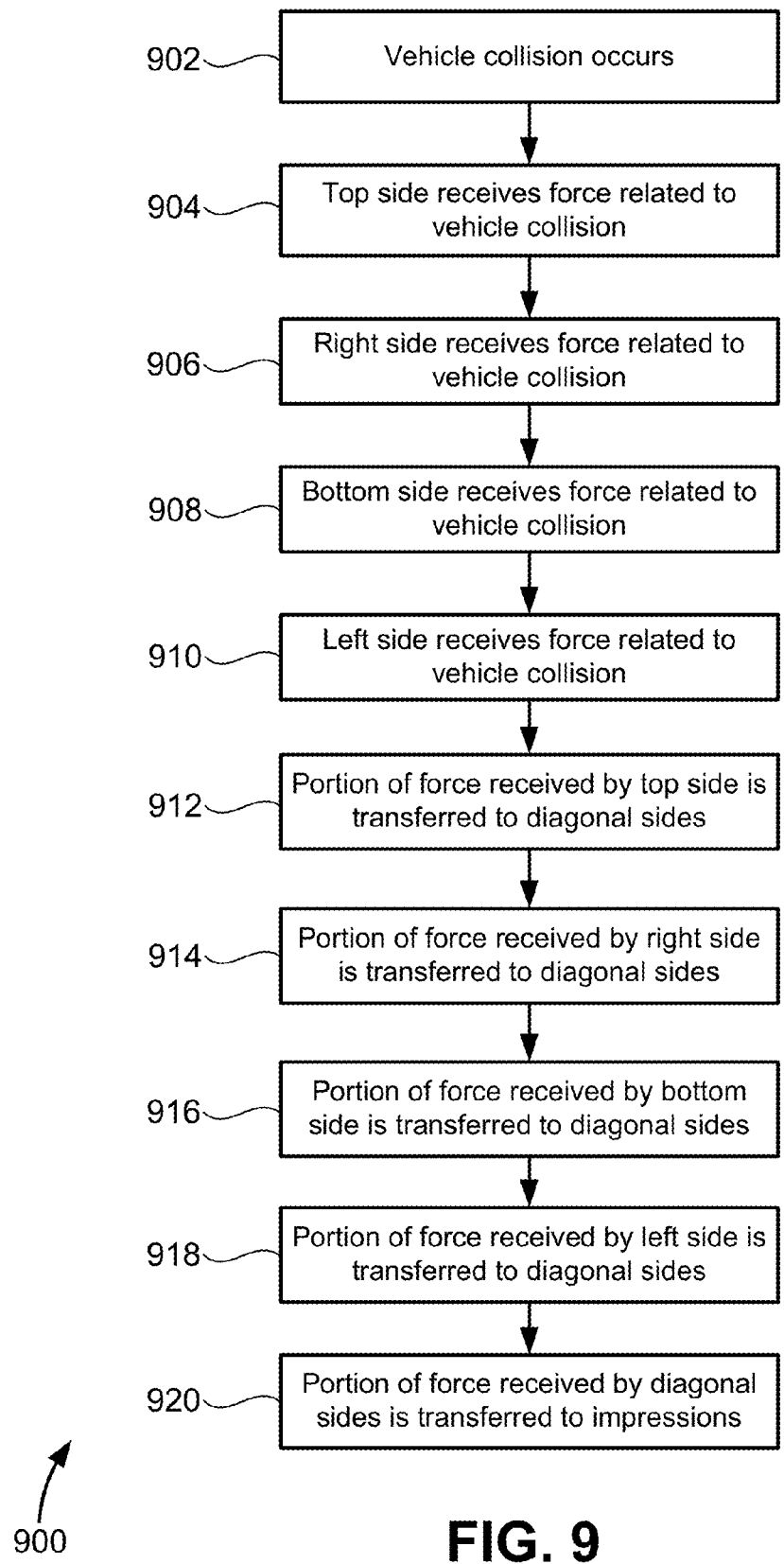
FIG. 9 illustrates a method for receiving an impact force related to a vehicle collision, according to an embodiment of the present disclosure.

FIG. 9 illustrates a method 900 for receiving an impact force related to a vehicle collision, according to an embodiment of the present disclosure. At step 902, a vehicle collision occurs. The collision may be a head-on (front), side, or angled impact, or an impact from some other direction. At step 904, the top side 106 receives a first force related to the impact force. At step 906, the right side 108 receives a second force related to the impact force. At step 908, the bottom side 110 receives a third force related to the impact force. At step 910, the left side 104 receives a fourth force related to the impact force. At step 912, a first portion of the first force received by the top side 106 is transferred to the diagonal sides 120. At step 914, a second portion of the second force received by the right side 108 is transferred to the diagonal sides 120. At step 916, a third portion of the third force received by the bottom side 110 is transferred to the diagonal sides 120. At step 918, a fourth portion of the fourth force received by the left side 104 is transferred to the diagonal sides 120. At step 920, a fifth portion of the force received by the diagonal sides 120 is transferred to the impressions 122. In some embodiments, method 900 further includes a step in which the impressions 122 are caused to fold in the longitudinal direction such that a forward side of the impressions 122 comes into physical contact with a rearward side of the impressions 122.

Figure 10:
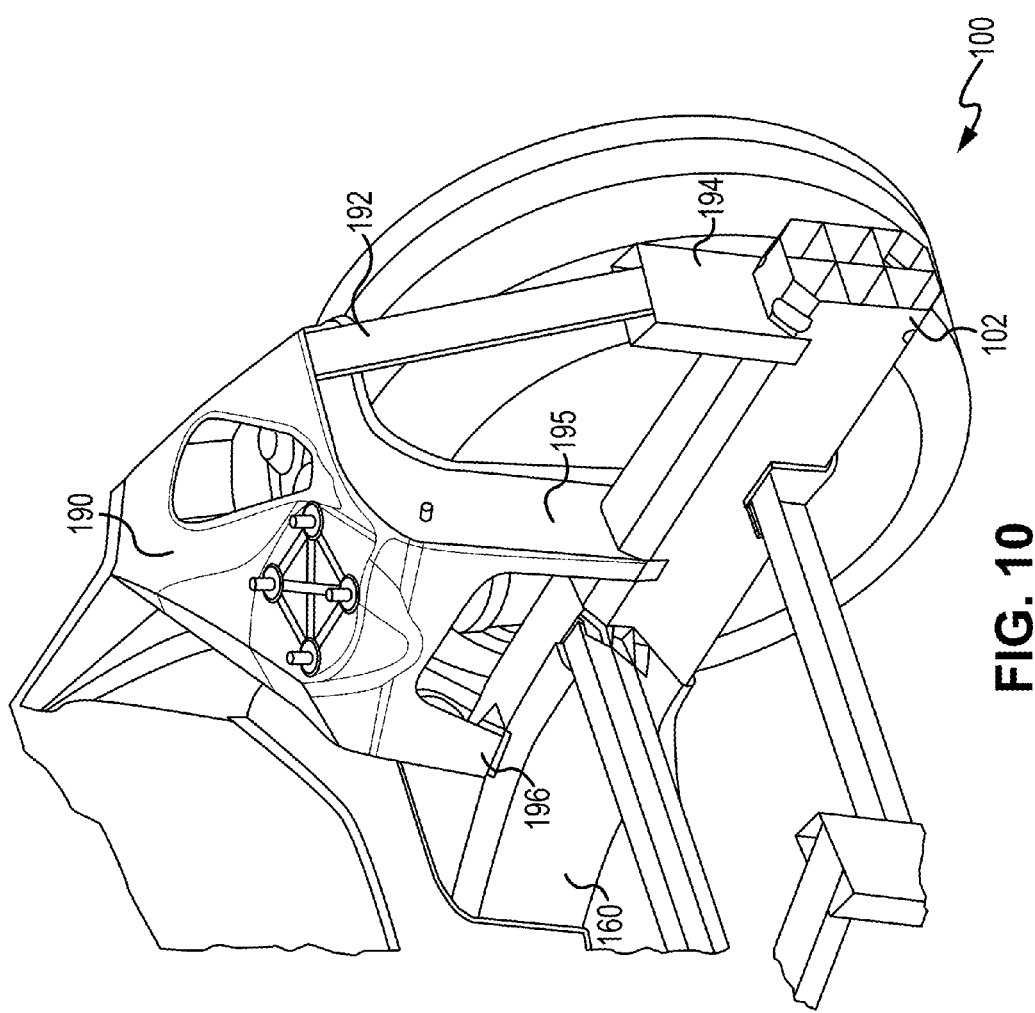
FIG. 10 illustrates a perspective view of a front region of an electric vehicle, according to an embodiment of the present disclosure.

FIG. 10 illustrates a perspective view of the front region of the electric vehicle 100, according to an embodiment of the present disclosure. In some embodiments, the shock tower 190 is designed to be as stiff as possible while preserving the functions of the crash beam 102 and the crash beam receiver 160. To accomplish this, three specifically designed connections between the shock tower 190 and the crash beam 102 and the crash beam receiver 160 are provided. The front securement member 194 is attached to the crash beam 102 along the lateral sides of the crash beam 102 (left side 104 and right side 108) but not along the top or diagonal sides of the crash beam 102. By not attaching to the top of the crash beam 102, in the event of a vehicle collision, undesirable vertical torques to the crash beam 102 by the front securement member 194 may be avoided. Furthermore, the front securement member 194 is attached to the sides of the crash beam 102 along a line parallel to the longitudinal direction, thereby further reducing undesirable torques. In some embodiments, the front securement member 194 is not coupled directly to the crash tower 190 but is coupled to a longitudinal beam 192 which is coupled to the crash tower 190.

Similar to the design of the front securement member 194, the middle securement member 195 is also attached to the crash beam 102 along the lateral sides but not the top or diagonal sides of the crash beam 102. The attachment of the middle securement member 195 differs from that of the front securement member 194 in that the attachment area is not linear but rather includes a square or rectangular area along the left side 104 and the right side 108 of the crash beam 102. The possibility of undesirable torques is lessened for the middle securement member 195 due to its proximity to the crash beam receiver 160, thus a stronger attachment may be employed. The rear securement member 196 is attached to the crash beam receiver 160 at the top of the crash beam receiver 160 through a large attachment area. In some embodiments, the shock tower 190, the middle securement member 195, and the rear securement member 196 are comprised from a single material.

Figure 11:
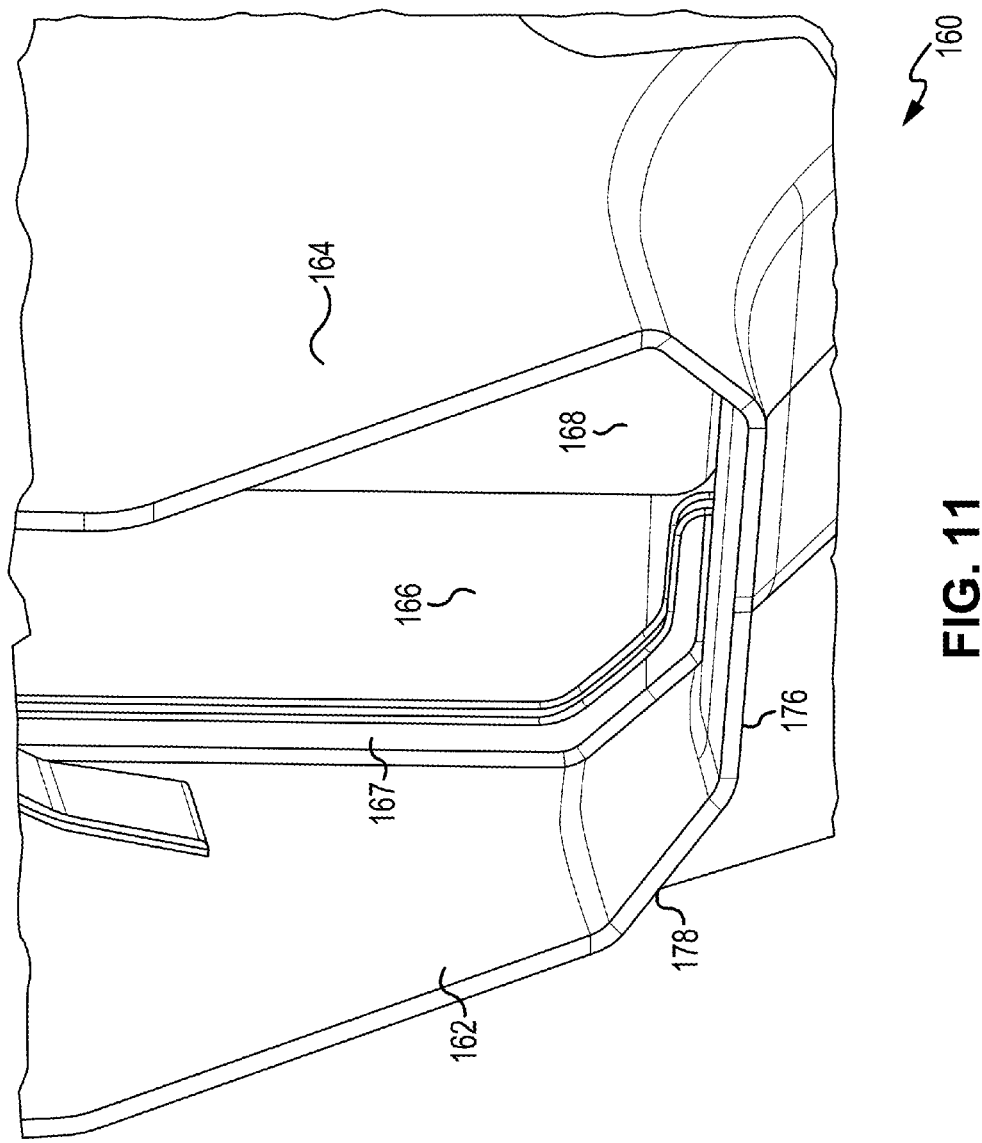
FIG. 11 illustrates a perspective view of a crash beam receiver, according to an embodiment of the present disclosure.

FIG. 11 illustrates a perspective view of the crash beam receiver 160, according to an embodiment of the present disclosure. In some embodiments, the crash beam receiver 160 includes a plurality of surfaces that are coupled together to form a hollow opening for receiving the crash beam 102. The plurality of surfaces may include a left surface 162, a right surface 164, a top surface 174 (not shown in FIG. 11), a bottom surface 176, and one or more diagonal surfaces 178. The plurality of surfaces may be coupled together such that the crash beam 102 may be securely inserted into the hollow opening.

In some embodiments, the crash beam receiver 160 includes a gate structure 165 comprising a left gate 166, a right gate 168, and a protrusion structure 167. The gate structure 165 performs at least two functions. First, the gate structure 165 provides a stopping point for the crash beam 102 when it is inserted into the crash beam receiver 160. Second, the gate structure 165 has properties that allow it to linearize the self-collapsing process of the crash beam 102 in the longitudinal direction, as will be described in reference to FIG. 12 below.

Figure 12:
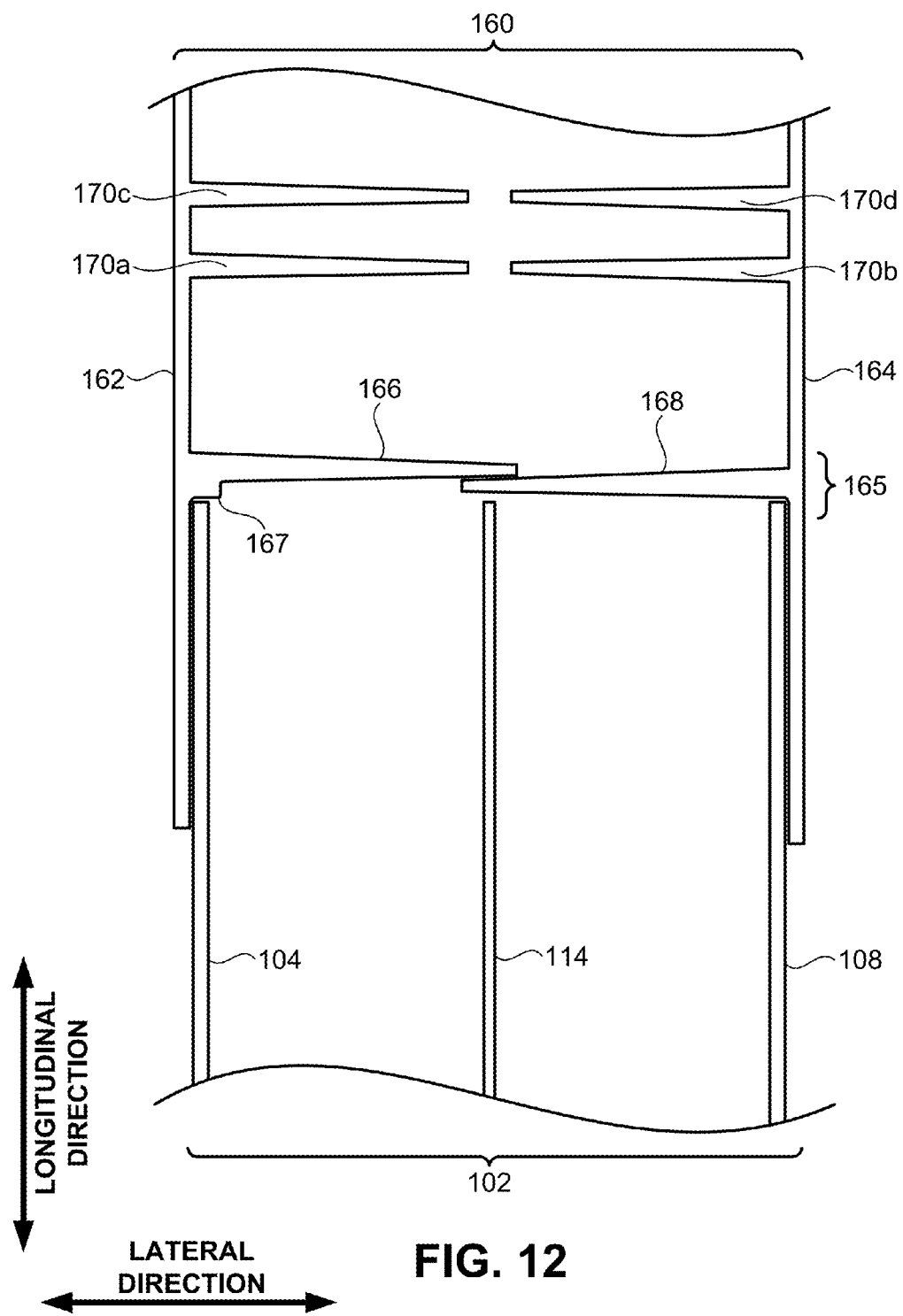
FIG. 12 illustrates a top view of a crash beam and a crash beam receiver, according to an embodiment of the present disclosure.

FIG. 12 illustrates a top view of the crash beam 102 and the crash beam receiver 160, according to an embodiment of the present disclosure. In some embodiments, the gate structure 165 includes the left gate 166 which is coupled to the left surface 162 within the hollow opening. The left gate 166 extends toward the right surface 164 in the lateral direction but does not directly couple to the right surface 164. In some embodiments, the left gate 166 is also coupled to the top surface 174, the bottom surface 176, and to one or more of the diagonal surfaces 178. In some embodiments, the left gate 166 is narrower toward the right lateral direction and thicker toward the left lateral direction. In other embodiments, the left gate 166 has uniform thickness in the lateral and vertical directions.

Figure 13:
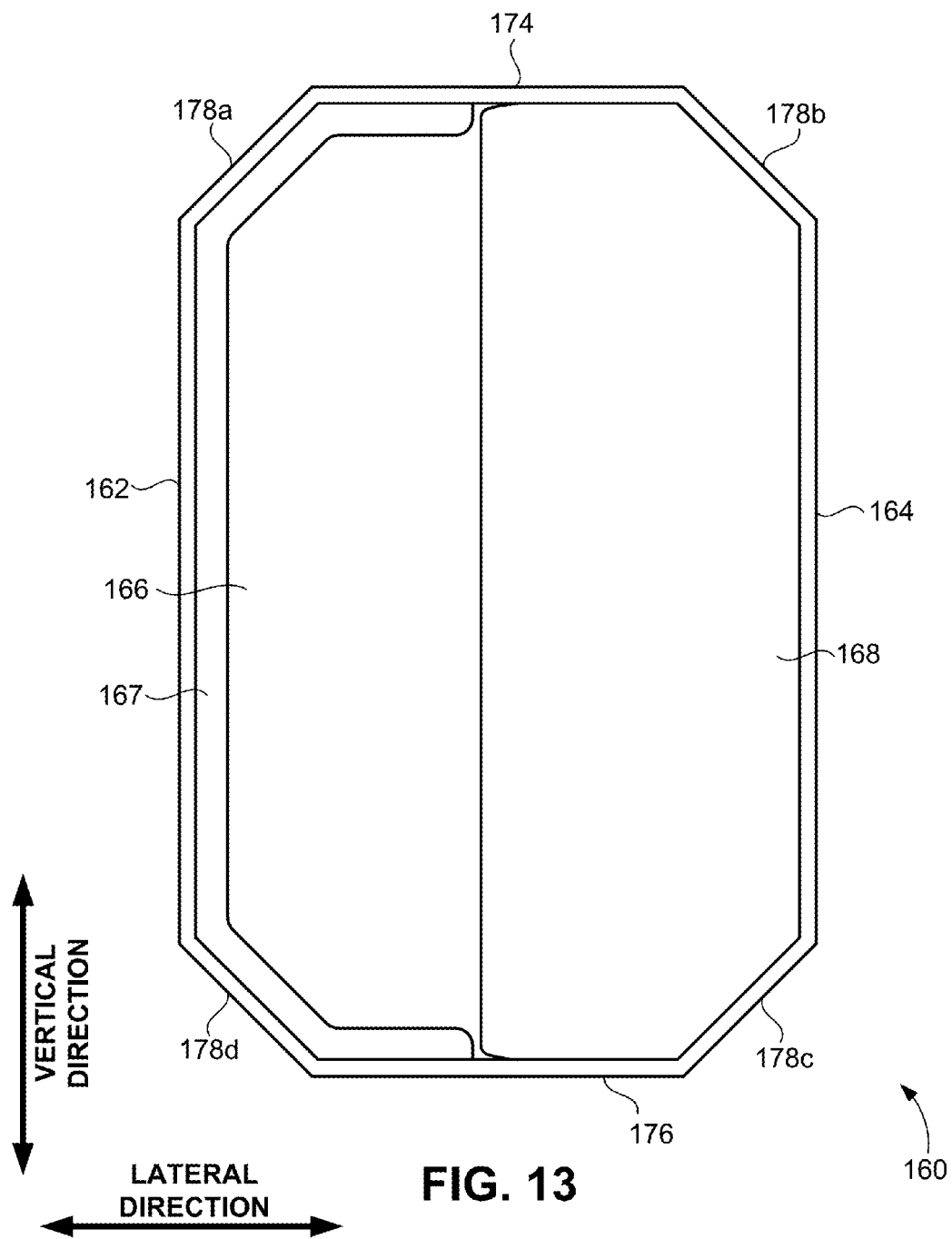
FIG. 13 illustrates a front view of a crash beam receiver, according to an embodiment of the present disclosure.

In some embodiments, the gate structure 165 includes the right gate 168 which is coupled to the right surface 164 within the hollow opening. The right gate 168 extends toward the left surface 162 in the lateral direction but does not directly couple to the left surface 162. In some embodiments, the right gate 168 is also coupled to the top surface 174, the bottom surface 176, and to one or more of the diagonal surfaces 178. In some embodiments, the right gate 168 is narrower toward the left lateral direction and thicker toward the right lateral direction. In other embodiments, the right gate 168 has uniform thickness in the lateral and vertical directions. In some embodiments, the right gate 168 overlaps and covers a portion of the left gate 166 such that a portion of the left gate 166 is obscured from a view from the front longitudinal direction toward the back longitudinal direction (as shown in FIG. 13). In some embodiments, a spacing exists between the left gate 166 and the right gate 168 such that they are not in physical contact with each other. In other embodiments, the left gate 166 and the right gate 168 are in physical contact with each other.

In some embodiments, the gate structure 165 includes a protrusion structure 167 positioned along the edge of the left gate 166. The protrusion structure 167 extends outward in the longitudinal direction from the left gate 166 and has a certain thickness. The thickness of the protrusion structure 167 may be determined such that the crash beam 102 may come in physical contact with the protrusion structure 167 and the right gate 168 simultaneously in the event of a vehicle collision. The protrusion structure 167 may be positioned along the entire edge of the left gate 166 or along some portion of it. In some embodiments, the protrusion structure 167 is positioned at the interface between the left gate 166 and the left surface 162 such that the protrusion structure 167 is coupled to both the left gate 166 and the left surface 162. The width of the protrusion structure 167 in the lateral direction is ideally greater than or equal to the width of the left side 104 of the crash beam 102, but not too wide to reduce the flexibility of the left gate 166.

In some embodiment, the gate structure 165 improves the self-collapsing process of the crash beam 102 by forcing the collapsing crash beam 102 to collapse inward toward the center rib 114. In the event of a vehicle collision, a head-on impact force pushes the crash beam 102 in the rearward longitudinal direction. The left side 104 and the right side 108 of the crash beam 102 come in contact with the gate structure 165 prior to the center rib 114 contacting the right gate 168, causing the left side 104 and the right side 108 to collapse inward toward the center rib 114. This process is enabled by (1) the left surface 162 and the right surface 164 extending past the gate structure 165 in the forward longitudinal direction, (2) the overlap of the left gate 166 and the right gate 168 being offset from the protrusion structure, and (3) the flexibility of the overlap of the left gate 166 and the right gate 168.

In some embodiments, the design of the crash beam receiver 160 is flipped in the lateral direction such that the protrusion structure 167 is positioned along the edge of the right gate 168 and the left gate 166 overlaps and covers a portion of the right gate 168 such that a portion of the right gate 168 is obscured from view. In some embodiments, the crash beam receiver 160 includes one or more wall structures 170 that form apertures along the center of the crash beam receiver 160 in the lateral direction. Multiple layers of the wall structures 170 may be positioned behind the gate structure 165. The wall structures 170 help to maintain the linearity of the self-collapsing process of the crash beam 102.

FIG. 13 illustrates a front view of the crash beam receiver 160, according to an embodiment of the present disclosure.

Figure 14:
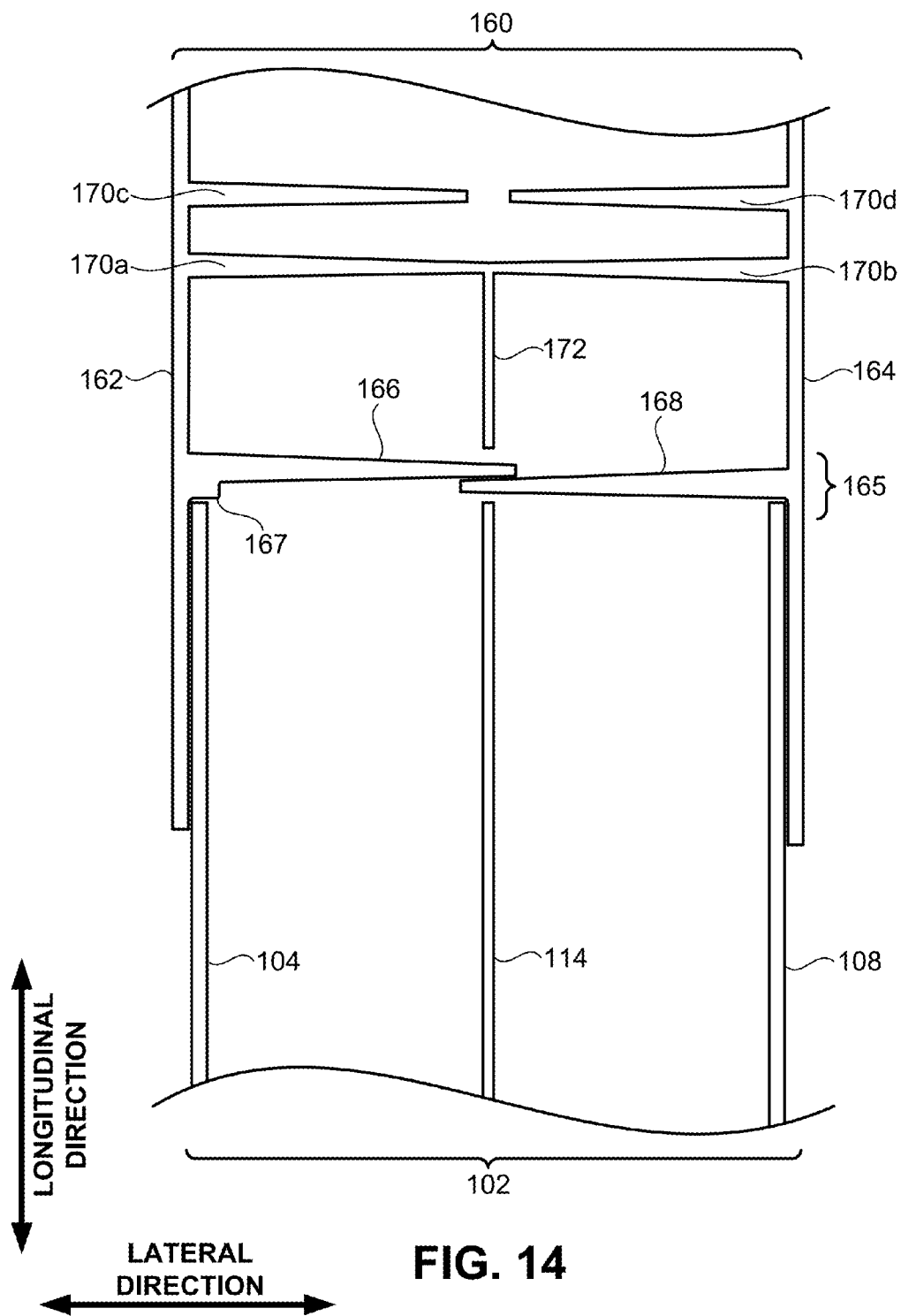
FIG. 14 illustrates a top view of a crash beam and a crash beam receiver, according to an embodiment of the present disclosure.

FIG. 14 illustrates a top view of the crash beam 102 and the crash beam receiver 160, according to an embodiment of the present disclosure. In some embodiments, the wall structures 170a and 170b may couple together at the center of the crash beam receiver 160 in the lateral direction. In some embodiments, a cantilever structure 172 may be attached to the wall structures 170 and may extend outward in the forward longitudinal direction toward the gate structure 165. The cantilever structure 172 may initiate a bending process of the wall structures 170 to help maintain the linearity of the self-collapsing process of the crash beam 102. The length of the cantilever structure 172 in the longitudinal direction may be based on the distance between the wall structures 170 and the gate structure 165 in the longitudinal direction and on the lengths of the left gate 166 and the right gate 168 in the lateral direction.

Figure 15:
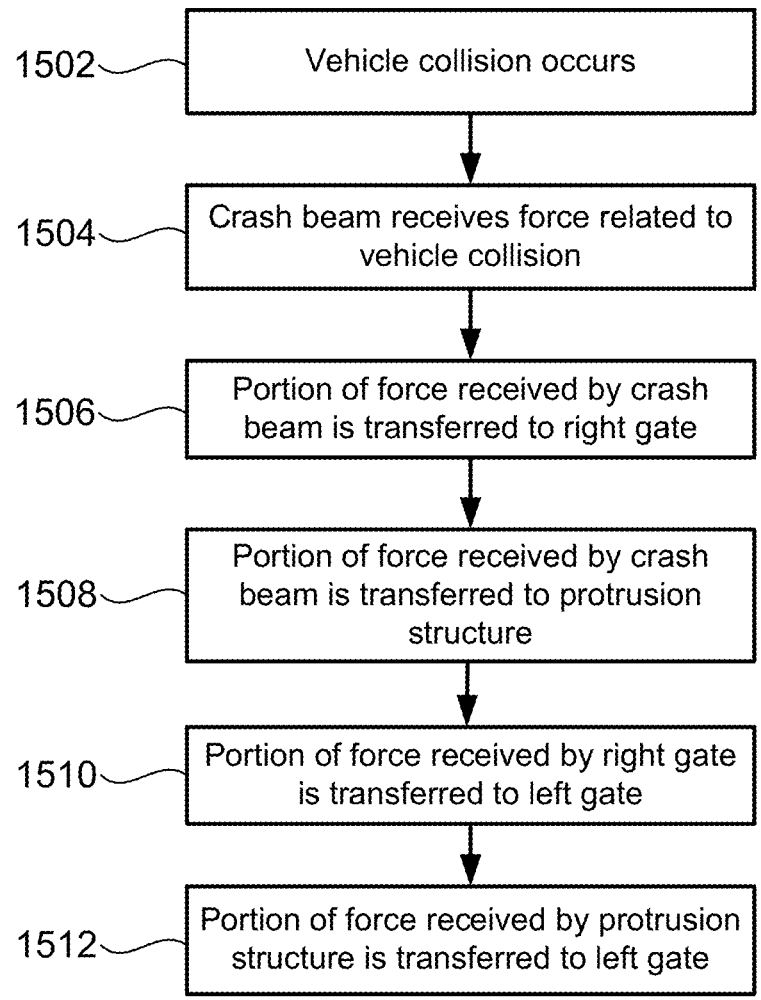
FIG. 15 illustrates a method for receiving an impact force related to a vehicle collision, according to an embodiment of the present disclosure.

FIG. 15 illustrates a method 1500 for receiving an impact force related to a vehicle collision, according to an embodiment of the present disclosure. At step 1502, a vehicle collision occurs. The collision may be a head-on (front), side, or angled impact, or an impact from some other direction. At step 1504, the crash beam 102 receives a first force related to the impact force. At step 1506, a first portion of the first force received by the crash beam 102 is transferred to the right gate 168. At step 1508, a second portion of the first force received by the crash beam 102 is transferred to the protrusion structure 167. At step 1510, a third portion of the force received by the right gate 168 is transferred to the left gate 166. At step 1512, a fourth portion of the force received by the protrusion structure 167 is transferred to the left gate 166.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

LIST OF TERMS

100—Electric Vehicle/Transportation Apparatus
102—Crash Beam
104—Left Side
106—Top Side
108—Bottom Side
110—Bottom Side
114—Center Rib
116—Upper Cross Rib
118—Lower Cross Rib
120—Diagonal Sides
122—Impressions
124—Spacing Structure
126—Inner Left Side
128—Inner Top Side
130—Inner Right Side
132—Inner Bottom Side
134—Inner Diagonal Sides
136—Inner Impressions
152—Steering Wheel
154—Users
160—Crash Beam Receiver
162—Left Surface
164—Right Surface
165—Gate Structure
166—Left Gate
167—Protrusion Structure
168—Right Gate
170—Wall Structures
172—Cantilever Structure
174—Top Surface
176—Bottom Surface
178—Diagonal Surfaces
180—Crash Wall
190—Crash Tower
192—Longitudinal Beam 194—Front Securement Member
195—Middle Securement Member
196—Rear Securement Member

What is claimed is:

1. A vehicle comprising:
   a crash beam;
   a crash beam receiver for coupling to the crash beam, the crash beam receiver comprising:
      a plurality of surfaces coupled together to form a hollow opening for receiving the crash beam, the plurality of surfaces including a left surface and a right surface;
      a left gate coupled to the left surface within the hollow opening, the left gate extending toward the right surface in the lateral direction, wherein a left interface includes an area where the left gate couples to the left surface;
      a right gate coupled to the right surface within the hollow opening, the right gate extending toward the left surface in the lateral direction, wherein a right interface includes an area where the right gate couples to the right surface; and
      a protrusion structure positioned at either the left interface or the right interface, the protrusion structure extending outward in the longitudinal direction from either the left gate or the right gate;
   wherein:
      when the protrusion structure is positioned at the left interface, a portion of the right gate overlaps and covers a portion of the left gate in the lateral direction; and
      when the protrusion structure is positioned at the right interface, a portion of the left gate overlaps and covers a portion of the right gate in the lateral direction.

2. The vehicle of claim 1, wherein the protrusion structure is positioned along either all of the left interface or all of the right interface.

3. The vehicle of claim 2, wherein the plurality of surfaces further comprise a top surface and a bottom surface, and wherein:
   the left gate is coupled to the top surface and the bottom surface;
   the left interface includes an area where the left gate couples to the top surface and an area where the left gate couples to the bottom surface;
   the right gate is coupled to the top surface and the bottom surface; and
   the right interface includes an area where the right gate couples to the top surface and an area where the right gate couples to the bottom surface.

4. The vehicle of claim 3, wherein the plurality of surfaces further comprise a plurality of diagonal surfaces, and wherein:
   the left gate is coupled to at least two of the plurality of diagonal surfaces;
   the left interface includes an area where the left gate couples to the at least two of the plurality of diagonal surfaces;
   the right gate is coupled to at least two of the plurality of diagonal surfaces; and
   the right interface includes an area where the right gate couples to the at least two of the plurality of diagonal surfaces.

5. The vehicle of claim 4, wherein the left gate becomes narrower toward the right lateral direction and wherein the right gate becomes narrower toward the left lateral direction.

6. The vehicle of claim 1, wherein the left gate has the same length in the lateral direction as the right gate.

7. The vehicle of claim 1, wherein the left surface and the right surface are planar and parallel to each other.

8. A crash beam receiver for coupling to a crash beam, the crash beam receiver comprising:
   a plurality of surfaces coupled together to form a hollow opening for receiving the crash beam, the plurality of surfaces including a left surface and a right surface;
   a left gate coupled to the left surface within the hollow opening, the left gate extending toward the right surface in the lateral direction, wherein a left interface includes an area where the left gate couples to the left surface;
   a right gate coupled to the right surface within the hollow opening, the right gate extending toward the left surface in the lateral direction, wherein a right interface includes an area where the right gate couples to the right surface; and
   a protrusion structure positioned at either the left interface or the right interface, the protrusion structure extending outward in the longitudinal direction from either the left gate or the right gate;
   wherein:
      when the protrusion structure is positioned at the left interface, a portion of the right gate overlaps and covers a portion of the left gate in the lateral direction; and
      when the protrusion structure is positioned at the right interface, a portion of the left gate overlaps and covers a portion of the right gate in the lateral direction.

9. The crash beam receiver of claim 8, wherein the protrusion structure is positioned along either all of the left interface or all of the right interface.

10. The crash beam receiver of claim 9, wherein the plurality of surfaces further comprise a top surface and a bottom surface, and wherein:
   the left gate is coupled to the top surface and the bottom surface;
   the left interface includes an area where the left gate couples to the top surface and an area where the left gate couples to the bottom surface;
   the right gate is coupled to the top surface and the bottom surface; and
   the right interface includes an area where the right gate couples to the top surface and an area where the right gate couples to the bottom surface.

11. The crash beam receiver of claim 10, wherein the plurality of surfaces further comprise a plurality of diagonal surfaces, and wherein:
   the left gate is coupled to at least two of the plurality of diagonal surfaces;
   the left interface includes an area where the left gate couples to the at least two of the plurality of diagonal surfaces;
   the right gate is coupled to at least two of the plurality of diagonal surfaces; and
   the right interface includes an area where the right gate couples to the at least two of the plurality of diagonal surfaces.

12. The crash beam receiver of claim 11, wherein the left gate becomes narrower toward the right lateral direction and wherein the right gate becomes narrower toward the left lateral direction.

13. The crash beam receiver of claim 8, wherein the left gate has the same length in the lateral direction as the right gate.

14. The crash beam receiver of claim 8, wherein the left surface and the right surface are planar and parallel to each other.

15. A method for receiving an impact force related to a vehicle collision, the method comprising:
for a vehicle comprising:
a crash beam;
a crash beam receiver for coupling to the crash beam, the crash beam receiver comprising:
a plurality of surfaces coupled together to form a hollow opening for receiving the crash beam, the plurality of surfaces including a left surface and a right surface;
a left gate coupled to the left surface within the hollow opening, the left gate extending toward the right surface in the lateral direction, wherein a left interface includes an area where the left gate couples to the left surface;
a right gate coupled to the right surface within the hollow opening, the right gate extending toward the left surface in the lateral direction, wherein a right interface includes an area where the right gate couples to the right surface; and
a protrusion structure positioned at either the left interface or the right interface, the protrusion structure extending outward in the longitudinal direction from either the left gate or the right gate;
wherein:
when the protrusion structure is positioned at the left interface, a portion of the right gate overlaps and covers a portion of the left gate in the lateral direction; and
when the protrusion structure is positioned at the right interface, a portion of the left gate overlaps and covers a portion of the right gate in the lateral direction;
receiving, by the crash beam, a first force related to the impact force;
transferring a first portion of the first force received by the crash beam to the right gate;
transferring a second portion of the first force received by the crash beam to the protrusion structure;
transferring a third portion of the force received by the right gate to the left gate; and
transferring a fourth portion of the force received by the protrusion structure to the left gate.

16. The method of claim 15, wherein the protrusion structure is positioned along either all of the left interface or all of the right interface.

17. The method of claim 16, wherein the plurality of surfaces further comprise a top surface and a bottom surface, and wherein:
the left gate is coupled to the top surface and the bottom surface;
the left interface includes an area where the left gate couples to the top surface and an area where the left gate couples to the bottom surface;
the right gate is coupled to the top surface and the bottom surface; and
the right interface includes an area where the right gate couples to the top surface and an area where the right gate couples to the bottom surface.

18. The method of claim 17, wherein the plurality of surfaces further comprise a plurality of diagonal surfaces, and wherein:
the left gate is coupled to at least two of the plurality of diagonal surfaces;
the left interface includes an area where the left gate couples to the at least two of the plurality of diagonal surfaces;
the right gate is coupled to at least two of the plurality of diagonal surfaces; and
the right interface includes an area where the right gate couples to the at least two of the plurality of diagonal surfaces.

19. The method of claim 18, wherein the left gate becomes narrower toward the right lateral direction and wherein the right gate becomes narrower toward the left lateral direction.

20. The method of claim 15, wherein the left gate has the same length in the lateral direction as the right gate.

\* \* \* \* \*